US012321737B1

(12) United States Patent
Desai et al.

(10) Patent No.: US 12,321,737 B1
(45) Date of Patent: Jun. 3, 2025

(54) AUTOMATING SOFTWARE APPLICATION INFRASTRUCTURE DEPLOYMENT IN A CLOUD COMPUTING ENVIRONMENT

(71) Applicant: FMR LLC, Boston, MA (US)

(72) Inventors: Arpan Desai, Murphy, TX (US); Rajat Jain, Apex, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/882,056

(22) Filed: Sep. 11, 2024

(51) Int. Cl.
*G06F 9/44* (2018.01)
*G06F 8/60* (2018.01)
*G06F 8/71* (2018.01)
*G06F 21/44* (2013.01)

(52) U.S. Cl.
CPC ............. *G06F 8/60* (2013.01); *G06F 8/71* (2013.01); *G06F 21/44* (2013.01)

(58) Field of Classification Search
CPC ...................................................... G06F 8/60
USPC ........................................................ 717/121
See application file for complete search history.

(56) References Cited

U.S. PATENT DOCUMENTS

| 9,858,060 | B2 * | 1/2018 | Barros ............... G06F 9/45558 |
| 10,872,029 | B1 | 12/2020 | Bawcom | |
| 10,884,732 | B1 | 1/2021 | Zolotow et al. | |
| 10,999,163 | B2 | 5/2021 | Abraham | |
| 11,010,191 | B1 | 5/2021 | Hornbeck | |
| 11,099,976 | B2 | 8/2021 | Khakare et al. | |
| 11,429,353 | B1 | 8/2022 | Liguori et al. | |
| 11,642,183 | B2 * | 5/2023 | Barral ............... A61B 34/30 713/150 |
| 2014/0282495 | A1 * | 9/2014 | Chico de Guzman Huerta .......... G06F 8/61 717/177 |
| 2020/0387357 | A1 | 12/2020 | Mathon et al. | |
| 2022/0052910 | A1 | 2/2022 | Neelakantam et al. | |
| 2023/0128753 | A1 | 4/2023 | Bawa et al. | |
| 2024/0267752 | A1 * | 8/2024 | Shete ............... H04W 24/02 |

OTHER PUBLICATIONS

"Horizontal Pod Autoscaling," Kubernetes Documentation, available at https://kubernetes.io/docs/tasks/run-application/horizontal-pod-autoscale/, last modified Feb. 18, 2024, retrieved on Sep. 23, 2024, 9 pages.

* cited by examiner

*Primary Examiner* — Evral E Bodden
(74) *Attorney, Agent, or Firm* — Cesari and McKenna, LLP

(57) ABSTRACT

Methods and apparatuses for automating software application infrastructure deployment in a cloud computing environment include defining hierarchical infrastructure layers for a software application, generating a deployment pipeline for the software application comprising pre-coded resource configuration modules, and triggering execution of the deployment pipeline to deploy the software application in the cloud computing environment.

20 Claims, 11 Drawing Sheets

```
buildpack:
  defaultContainer: ubn22-aws-utils
  containers:
    - ubn22-aws-utils
  environment:
    nonproduction:
      vault:
        PIPELINE_USR: pr123456/PIPELINE_USR
        PIPELINE_PSW: pr123456/PIPELINE_PSW
  segments:
    version: release-0.0.62
    nonproduction:
      dev:
        terraformLayers:
          stageContainer: ubn22-aws-utils
          parameters:
            environment: dev
            organization: p
            productLineId: pl123456
            productId: pr123456
            appId: ap123456
            cloud_provider:
              aws:
                accountId: 1234567890010
                region: us-east-1
          layers:
            kms_02_layer:
              type: 'terraform-aws-kms'
              version: '1.0'
              dependencies:  # optional
              skip: 'false' # optional
              destroy: 'false' # optional
            sqs_02_layer:
              type: 'terraform-aws-sqs'
              version: '1.0'
              dependencies:  # optional
                - kms_02_layer
              skip: 'false' # optional
              destroy: 'true' # optional
```

AUTOMATING SOFTWARE APPLICATION INFRASTRUCTURE DEPLOYMENT IN A CLOUD COMPUTING ENVIRONMENT

TECHNICAL FIELD

This application relates generally to methods and apparatuses, including computer program products, for automating software application infrastructure deployment in a cloud computing environment.

BACKGROUND

Many medium and large enterprise computing environments rely on a variety of cloud-based computing environments and service providers to provision and host end user software applications. In such computing environments, there is a need for rapid configuration and deployment of cloud-based computing and infrastructure resources that also complies with governance and regulatory requirements (e.g., security, redundancy, scalability).

Infrastructure As Code (IaC) is a key DevOps practice that involves the management of cloud-based computing infrastructure. The IaC framework includes networks, compute resources, databases, storage, and connection topology. IaC allows development teams to build and release application and supporting infrastructure changes faster and with greater confidence. However, currently available software that supports IaC processes lacks key features for orchestration and automation of deployment of infrastructure, applications, middleware configuration, and database changes into development, test, and production environments. For example, existing tools are engineered to be compatible with only a single cloud service provider and cannot be adapted to conduct IaC deployment across different service providers. In addition, IaC software is not capable of modularizing the deployment process, or automating governance validation checks prior to initiating deployment.

SUMMARY

Therefore, what is needed are methods and systems for automating software application infrastructure deployment in a cloud computing environment using a defined deployment pipeline-thereby eliminating the effort associated with developer building, testing, and deployment of application infrastructure resources in the cloud. The techniques described herein advantageously leverage the concepts of modularization and control abstraction for infrastructure deployment. The methods and systems use a dynamic pipeline, enabling development teams to deploy application infrastructure without expertise in any particular modularization platform (e.g., Terraform). The dynamic pipeline streamlines the creation and maintenance of application infrastructure through faster infrastructure provisioning, consistent infrastructure configurations, and versioned management of common resources. The pipeline technology described herein also enforces the shift-left principle by automating deployment and addressing security during the initial stage of development for, e.g., governance-which reduces risk since many issues are addressed long before application release.

The invention, in one aspect, features a system for automating software application infrastructure deployment in a cloud computing environment. The system includes a server computing device having a memory for storing computer-executable instructions and a processor that executes the computer-executable instructions. The server computing device defines a plurality of hierarchical infrastructure layers for a software application, each layer comprising one or more computing resources used for execution of the software application in the cloud computing environment. The server computing device generates a deployment pipeline for the software application in the cloud computing environment, the pipeline comprising a plurality of pre-coded resource configuration modules operable to provision the hierarchical infrastructure layers for the software application in one or more cloud computing environments. The server computing device triggers execution of the deployment pipeline to deploy the software application in the cloud computing environment, including: validating the hierarchical infrastructure layers for the software application using one or more compliance policies, executing each of the pre-coded resource configuration modules in the pipeline to deploy the software application in the cloud computing environment, including, for each pre-coded resource configuration module, configuring one or more computing resources in the cloud computing environment according to the defined hierarchical infrastructure layers for the software application, determining that the deployment pipeline has completed execution by programmatically verifying one or more aspects of the deployed software application, and transmitting a notification message to one or more remote computing devices upon completion of the pipeline execution. The server computing device makes the deployed software application available to receive application access requests from one or more client computing devices.

The invention, in another aspect, features a computerized method of automating software application infrastructure deployment in a cloud computing environment. A server computing device defines a plurality of hierarchical infrastructure layers for a software application, each layer comprising one or more computing resources used for execution of the software application in the cloud computing environment. The server computing device generates a deployment pipeline for the software application in the cloud computing environment, the pipeline comprising a plurality of pre-coded resource configuration modules operable to provision the hierarchical infrastructure layers for the software application in one or more cloud computing environments. The server computing device triggers execution of the deployment pipeline to deploy the software application in the cloud computing environment, including: validating the hierarchical infrastructure layers for the software application using one or more compliance policies, executing each of the pre-coded resource configuration modules in the pipeline to deploy the software application in the cloud computing environment, including, for each pre-coded resource configuration module, configuring one or more computing resources in the cloud computing environment according to the defined hierarchical infrastructure layers for the software application, determining that the deployment pipeline has completed execution by programmatically verifying one or more aspects of the deployed software application, and transmitting a notification message to one or more remote computing devices upon completion of the pipeline execution. The server computing device makes the deployed software application available to receive application access requests from one or more client computing devices.

Any of the above aspects can include one or more of the following features. In some embodiments, the pre-coded resource configuration modules are stored in a code repository coupled to the server computing device. In some embodiments, the pre-coded resource configuration modules are arranged in a defined execution sequence within the deployment pipeline.

In some embodiments, executing each of the pre-coded resource configuration modules in the pipeline to deploy the software application in the cloud computing environment includes, for one or more of the pre-coded resource configuration modules, authenticating to the cloud computing environment using authentication credentials prior to executing the pre-coded resource configuration modules. In some embodiments, executing each of the pre-coded resource configuration modules in the pipeline to deploy the software application in the cloud computing environment includes, for one or more of the pre-coded resource configuration modules, invoking an application programming interface to connect to an external resource provider and retrieving one or more resource configuration files from the external resource provider to configure the corresponding computing resources in the cloud computing environment. In some embodiments, executing each of the pre-coded resource configuration modules in the pipeline to deploy the software application in the cloud computing environment includes, for one or more of the pre-coded resource configuration modules, running one or more performance tests against the corresponding computing resources in the cloud computing environment. In some embodiments, executing each of the pre-coded resource configuration modules in the pipeline to deploy the software application in the cloud computing environment includes, for one or more of the pre-coded resource configuration modules, installing one or more components of the software application within the corresponding computing resources in the cloud computing environment.

In some embodiments, each of the hierarchical infrastructure layers comprise one or more services that support operation of the software application. In some embodiments, lower infrastructure layers in the hierarchy expose services for use by higher infrastructure layers.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram of an exemplary file used to define the deployment pipeline for automating software application infrastructure deployment in a cloud computing environment.

DETAILED DESCRIPTION

Figure 1:
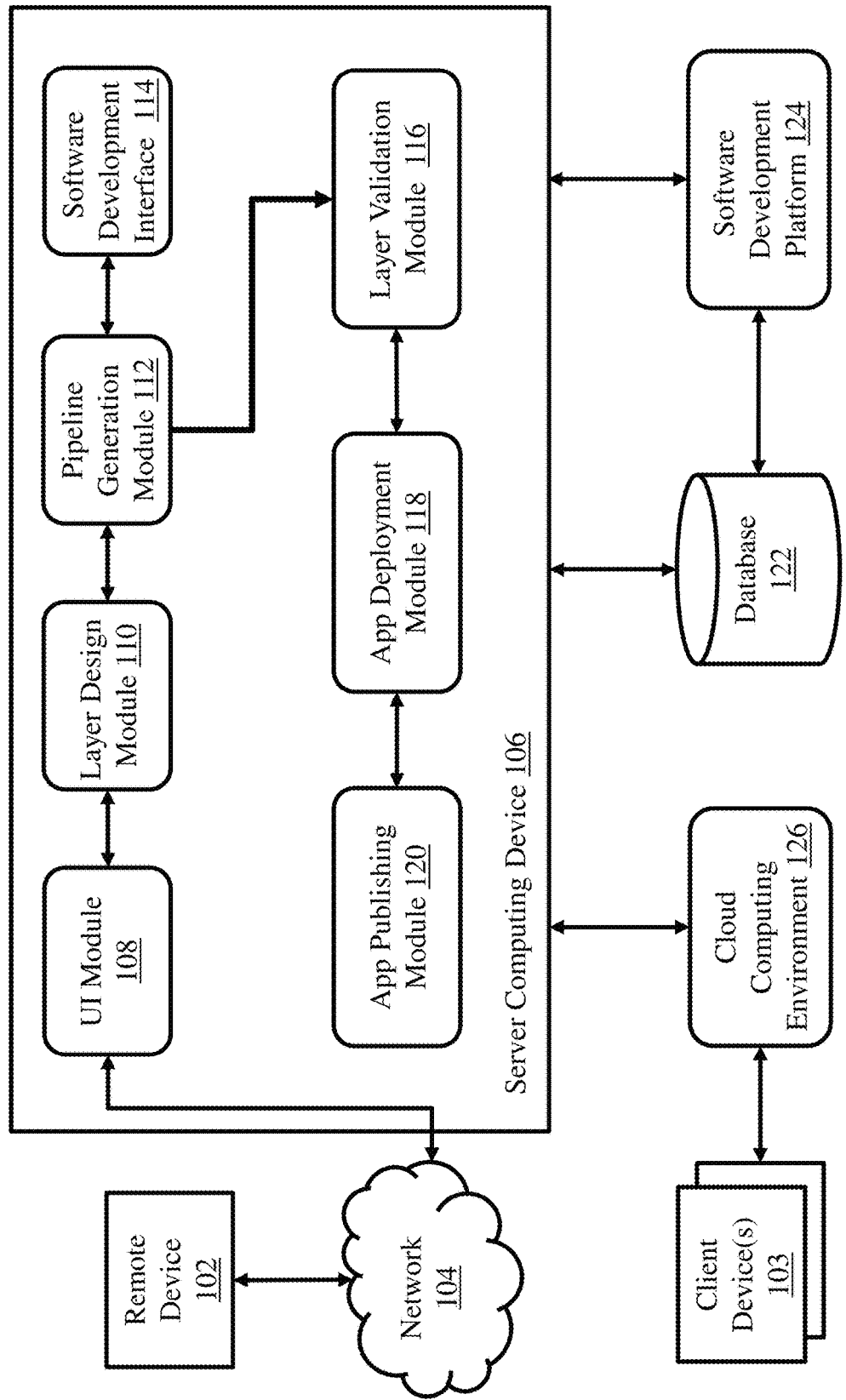
FIG. 1 is a block diagram of a system for automating software application infrastructure deployment in a cloud computing environment.

FIG. 1 is a block diagram of a system 100 for automating software application infrastructure deployment in a cloud computing environment. System 100 includes one or more computing devices (e.g., remote computing device 102 and client computing device(s) 103) that are coupled via communications network 104 to server computing device 106. Server computing device 106 includes user interface (UI) module 108, layer design module 110, pipeline generation module 112, software development interface 114, layer validation module 116, application deployment module 118, and application publishing module 120. Server computing device 106 is coupled to one or more databases (e.g., database 122), software development platform 124, and cloud computing environment 126.

Remote computing device 102 connects to communications network 104 in order to communicate with server computing device 106 to provide input and receive output relating to the process of automating software application infrastructure deployment in a cloud computing environment as described herein. Remote computing device 102 is coupled to a display device (not shown). For example, remote computing device 102 can provide a detailed graphical user interface (GUI) via the display device that presents output resulting from the methods and systems described herein, where the GUI is utilized by an operator to review data associated with the process of automating software application infrastructure deployment in a cloud computing environment.

Client computing devices 103 connect to cloud computing environment 126 in order to communicate with access one or more software applications deployed to cloud computing environment 126 by server computing device 106 using the process of automating software application infrastructure deployment in a cloud computing environment as described herein. In some embodiments, client computing devices 103 are operated by end users that desire to access functionality provided by the deployed software applications. Client computing devices 103 can connect to cloud computing environment 126 via one or more communications networks including, in some embodiments, network 104.

Exemplary remote computing devices 102 and client computing devices 103 include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single remote computing device 102, it should be appreciated that system 100 can include any number of remote computing devices.

Communication network 104 enables the other components of system 100 to communicate with each other in order to perform the process of automating software application infrastructure deployment in a cloud computing environment as described herein. Network 104 may be a local network, such as a LAN (local area network), or a wide area network, such as the Internet and/or a cellular network. In some embodiments, network 104 is comprised of several discrete networks and/or sub-networks (e.g., cellular to Internet) that enable the components of system 100 to communicate with each other.

Server computing device 106 is a combination of hardware, including one or more special-purpose processors and one or more physical memory modules, and specialized software modules-such as UI module 108, layer design module 110, pipeline generation module 112, software development interface 114, layer validation module 116, application deployment module 118, and application publishing module 120—that execute on one or more of the processor(s) of server computing device 106, to receive data from other components of system 100, transmit data to other components of system 100, and perform functions for automating software application infrastructure deployment in a cloud computing environment as described herein. In some embodiments, modules 108 through 120 are specialized sets of computer software instructions programmed onto a dedicated processor (or processors) in server computing device 106 and can include specifically designated memory locations and/or registers for executing the specialized computer software instructions. Further explanation of the specific processing performed by modules 108 through 120 is provided below.

In some embodiments, software development interface 114 enables developers and other technical team members using remote computing devices 102 to integrate application infrastructure changes into software development platform 124 and to add/modify cloud-based resources used to deploy a software application in cloud environment 126. In some embodiments, software development interface 114 is based upon the Jenkins™ platform (available from jenkins.io).

Database 122 comprises transient and/or persistent memory for data storage, that is used in conjunction with the process of automating software application infrastructure deployment in a cloud computing environment as described herein. In some embodiments, database 122 stores certain data elements relating to the infrastructure, features, consumed resources, and other configuration aspects of each software application deployed to cloud computing environment 126 by server computing device 106. The data in database 122 can be also used by UI module 108 for the generation of one or more user interface screens that are presented to a user via, e.g., client device 102, as explained in greater detail below.

Software development platform 124 is a computing device, or set of computing devices, that host and provide computing resources for application developers, testers, and other technical staff to build and test software applications that are deployed to cloud computing environment 126. Generally, software development platform 124 comprises source code management (SCM) system(s) configured to store and manage software application code files, artifacts, libraries, version control mechanisms, function calls, configuration files, metadata, and other elements that make up one or more software applications for deployment in cloud computing environment 126. In some embodiments, software development platform 124 is hosted on one or more remote computing devices (e.g., cloud-based architecture) that are accessible to server computing device 106. Exemplary software development platforms 124 include GitHub™ (available at github.com), and Mercurial™ (available from mercurial-scm.org).

Cloud computing environment 126 is a combination of hardware, including one or more computing devices comprised of special-purpose processors and one or more physical memory modules, and specialized software executed by processor(s) of computing devices in cloud computing environment 126, to receive application access requests from client computing devices 103, process the application access requests, and provide responses (including requested application functionality) to the application access requests. In some embodiments, cloud computing environment is configured as a distributed computing platform and/or in a software-as-a-service (SaaS) architecture. In some embodiments, cloud computing environment 126 dynamically allocates and scales computing resources in order to meet the demand of client computing devices while also providing cost resource benefits for the organization managing the environment 126 (i.e., only utilizing a minimum level of necessary computing resources for current and/or near-term anticipated demand). Exemplary computing platforms that can be used for cloud computing environment 126 include, but are not limited to, Amazon® Web Services (AWS); IBM® Cloud™; and Microsoft® Azure™. It should be appreciated that other types of computing resource distribution and configuration in a distributed computing environment can be used within the scope of the technology described herein.

In some embodiments, cloud computing environment 126 comprises a plurality of infrastructure/resource layers: a virtual machine/pod layer, a function layer, and a database layer. In some embodiments, the virtual machine/pod layer a comprises a plurality of software application instances (e.g., pods, containers, and/or virtual machines) in isolation from each other, which access a single operating system (OS) kernel. The virtual machine/pod layer can execute each software application instance in a separate OS process and constrain each instance's access to physical resources (e.g., CPU (central processing unit), memory) of one or more underlying hardware computing devices in environment 126 so that a single instance does not utilize all of the available physical resources. Cloud computing environment 126 can be configured to scale the virtual machine/pod layer horizontally (e.g., create new instances) as needed, based upon the demand received from client devices (e.g., devices 103). In some embodiments, the virtual machine/pod layer is an Amazon® Elastic Compute Cloud (EC2™) layer. In some embodiments, the virtual machine/pod layer utilizes the Kubernetes™ container deployment platform to deploy, manage, and scale the application instances. In these embodiments, server computing device 106 can interface with cloud computing environment 126 (e.g., via the Kubernetes Pod Autoscaler API (application programming interface) functionality, described at kubernetes.io/docs/tasks/run-application/horizontal-pod-autoscale/) in order to provide customized scaling commands. It should be appreciated that other customized or commercially available instance orchestration platforms (e.g., Apache Mesos™, Boxfuse™) can be used within the scope of invention.

In some embodiments, the function layer comprises a plurality of serverless compute services or functions that are capable of executing code, processes, function calls, and/or other computing tasks in order to, e.g., interface with the database layer c to read/write/update data as part of requests received from the virtual machine/pod layer. Exemplary function layers include, but are not limited to, Amazon® AWS Lambda™ (aws.amazon.com/lambda), Microsoft® Azure™ Functions (azure.microsoft.com/en-us/services/functions), and others.

In some embodiments, the database layer comprises one or more database instances that are configured to receive, generate, and store specific segments of data in response to one or more requests received from the virtual machine/pod layer via the function layer. In some embodiments, database instances in the database layer can comprise fully managed relational databases (e.g., Microsoft® SQL (Structured Query Language) Server™, Amazon® RDS™ (Relational Database Service)), NoSQL (non-Structured Query Language) databases (e.g., MongoDB™), in-memory databases, and other types of database platforms.

Generally, a software application deployed to cloud computing environment 126 is a collection of functions, procedures, definitions, and protocols that provide certain defined functionality and data in response to end user requests. In some embodiments, one or more deployed software applications are configured to use an application programming interface (API) paradigm, whereby application requests and responses can be exchanged between client computing devices and cloud computing environment 126 using any of a number of different architectures, including but not limited to: Representational State Transfer (REST) or Simple Object Access Protocol (SOAP). In one implementation of the REST architecture that can be used in system 100, for example, resources are accessed using Uniform Resource Identifiers (URIs) and requests/responses are exchanged using Hypertext Transfer Protocol (HTTP).

Figure 2:
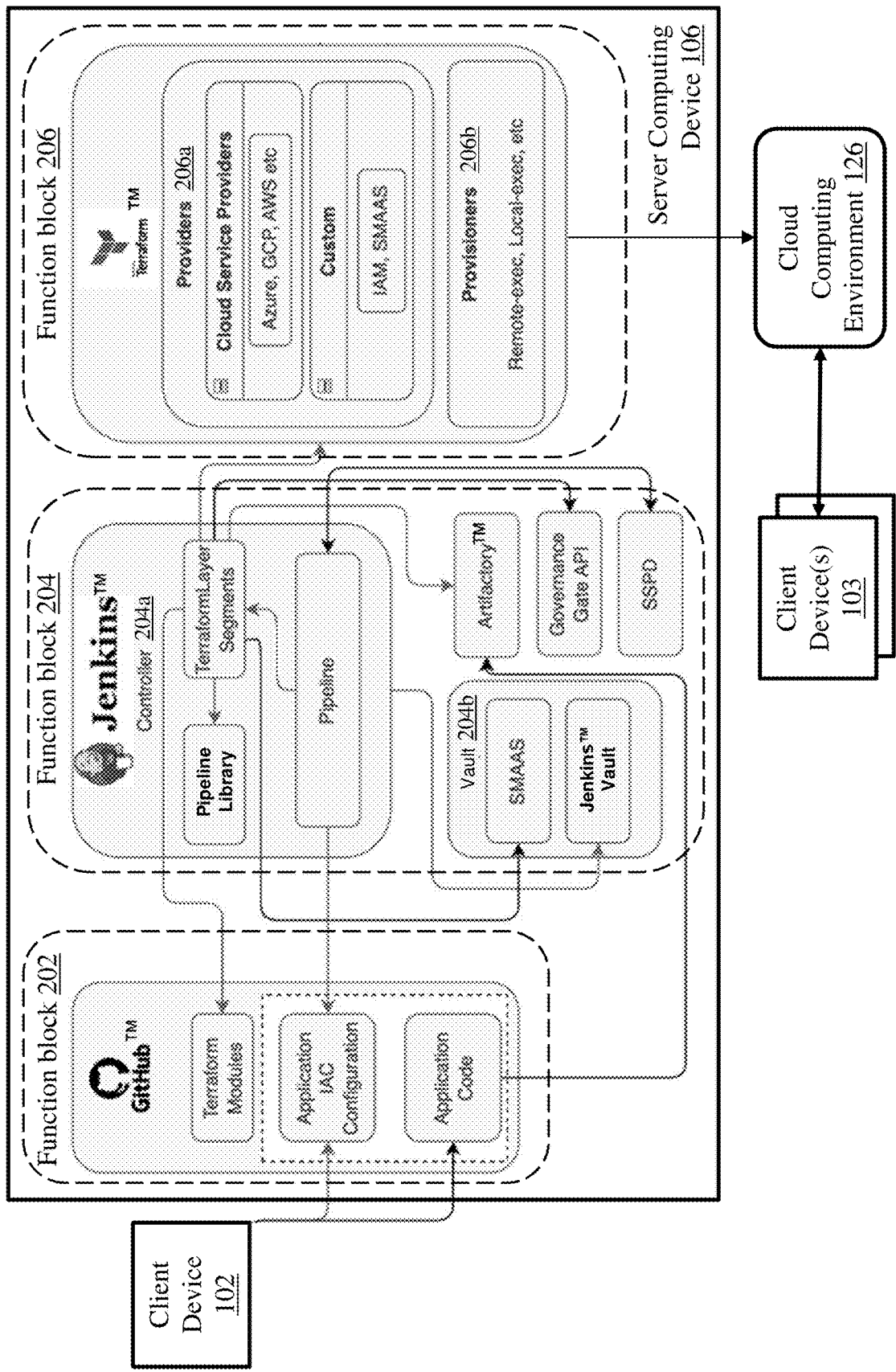
FIG. 2 is a detailed block diagram of a system for automating software application infrastructure deployment in a cloud computing environment.

FIG. 2 is a detailed function block diagram of a system 200 for automating software application infrastructure deployment in a cloud computing environment. It should be appreciated that the functions depicted in FIG. 2 can be performed by one or more of the computing modules 108 through 120 described above with respect to server computing device 106 of FIG. 1. As shown in FIG. 2, server computing device 106 includes software infrastructure function block 202 (which, in some embodiments, uses GitHub™-based functionality) configured to perform storing of pre-coded resource configuration modules (i.e., Terraform™ modules) for a variety of different cloud-based resources (e.g., S3, KMS, Lambda, SNS, SQS). In addition, function block 202 can store application infrastructure as code (IAC) configuration files and artifacts, along with application code, to enable development team members using client device 102 to modify application code and application infrastructure layer configuration as needed.

Server computing device 106 also includes deployment pipeline function block 204 (which, in some embodiments, uses Jenkins™-based and/or Terraform™-based functionality). Function block 204 includes controller 204a which is configured to enable developers to perform pipeline/infrastructure deployment changes for each software application and adding/modifying cloud-based infrastructure resources, to create and update deployment pipelines for specific applications. Controller 204a includes pipeline library which includes a plurality of reusable functions (e.g., Apache Groovy™ functions) for repetitive operations. These functions can be used within multiple pipelines and/or infrastructure layer segments. Controller 204a also includes Terraform Layer Segments which combine multiple Pipeline Library functions into a single consumable process. For example, controller 204a defines parameters that are then passed into the functions to allow the layer segment to perform its task. Controller 204a also includes pipeline which defines the end-to-end software application infrastructure deployment workflow.

Function block 204 also includes vault 204b (e.g., Vault available from HashiCorp™ (www.hashicorp.com/products/vault)) which is configured to store access/authentication credentials required for each deployment pipeline constructed by the developers to interface with cloud computing environment 126 for the purposes of deploying one or more infrastructure resources for the software application(s). For example, vault 204b can store at minimum two service accounts for cloud environment 126: one service account at the product level to access application lifecycle management tools (e.g., GitHub™, Artifactory™) and another service account at the application level to access security management as a service (SMAAS) features for the specific cloud service provider (e.g., AWS™, Azure™). Function block 204 also includes an application code artifact repository 204c (i.e., Jfrog Artifactory™) used to store and version the application code artifacts, a governance gate API 204d that validates the application infrastructure configuration/plan being deployed via a pipeline meets certain compliance policies (e.g., enterprise cloud compliance (ECC) policies). Function block 204 also includes self-service production deployment (SSPD) module to automate execution of application infrastructure deployment in cloud environment 126.

Server computing device 106 also includes application deployment function block 206 (which, in some embodiments, uses Terraform™-based functionality). Function block 206 includes providers 206a (i.e., Terraform™ modules) that enable communication between server computing device 106 and a diverse range of services and resources, including but not limited to cloud providers (e.g., Azure™, Google Cloud™ Platform (GCP), AWS™), databases, and Domain Name System (DNS) services. Community-supported providers 206a are also available for, e.g., custom interfaces such as identity and access management (IAM) and SMAAS. By utilizing providers 206a, developers can maintain the software application infrastructure layers in a consistent and reproducible manner, regardless of the underlying service or provider. Function block 206 also includes provisioners 206b which enable execution of scripts or commands on newly created cloud-based resources or instances in environment 126. In some embodiments, the scripts/commands can be used for various purposes, such as setting up and configuring the application infrastructure, installing software, running tests, and performing any other necessary actions to deploy the software application in cloud computing environment 126.

Figure 3:
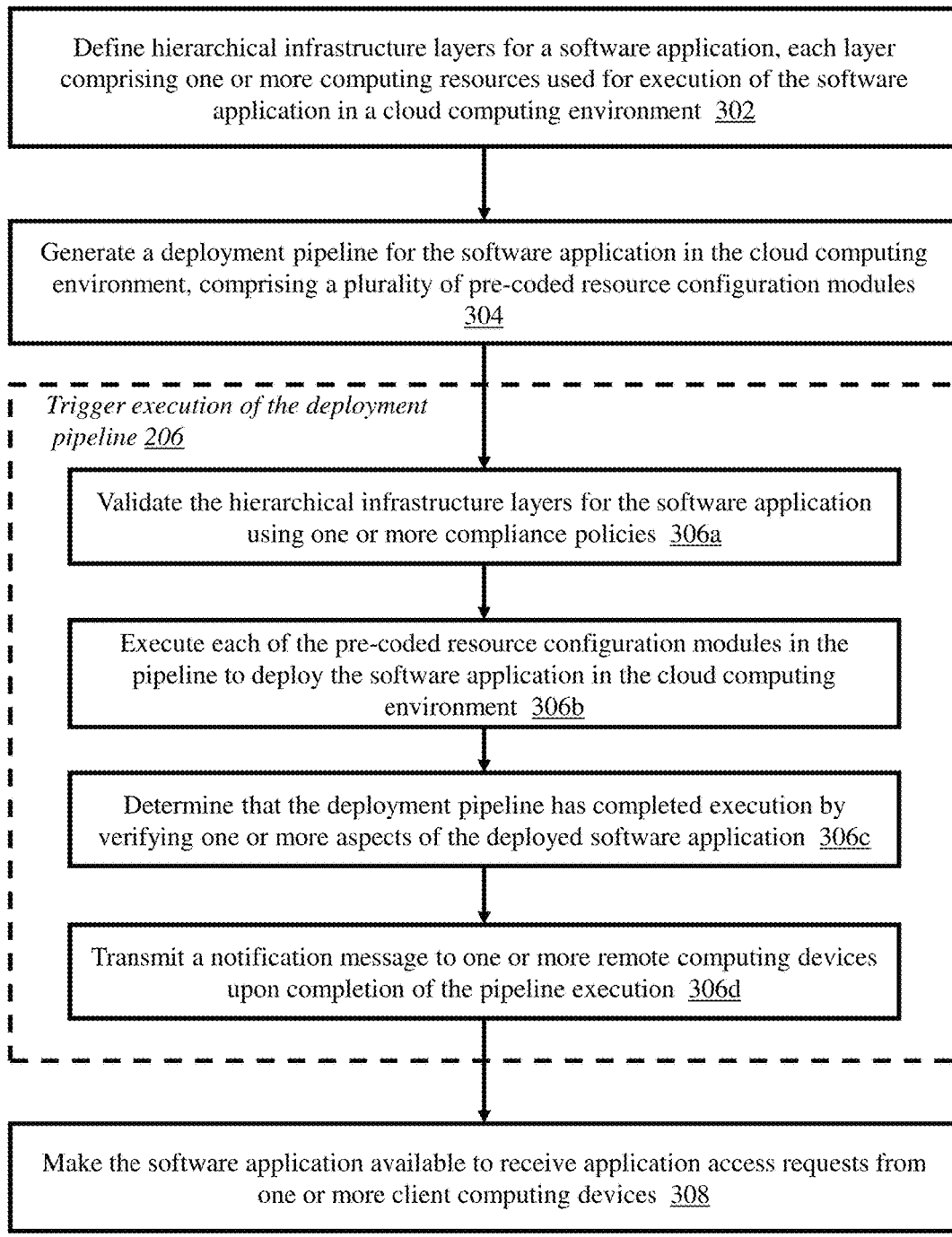
FIG. 3 is a flow diagram of a computerized method of automating software application infrastructure deployment in a cloud computing environment.

FIG. 3 is a flow diagram of a computerized method 300 of automating software application infrastructure deployment in a cloud computing environment, using system 100 of FIG. 1. In some embodiments, server computing device 106 is accessible by software installed at remote computing device 102 to enable remote computing device 102 to connect to UI module 108 via an HTTP session in a browser, provide commands for the creation, configuration, and/or execution of one or more software application infrastructure deployment pipelines, and receive and view UI screens associated with the status and progress of application pipeline execution and application deployment in cloud computing environment 126. For example, upon logging into server computing device 106, a user at remote computing device 102 can interact with layer design module 110 to define (step 302) a plurality of hierarchical infrastructure layers for a software application, each layer comprising one or more computing resources used for execution of the software application in the cloud computing environment 126.

Figure 4:
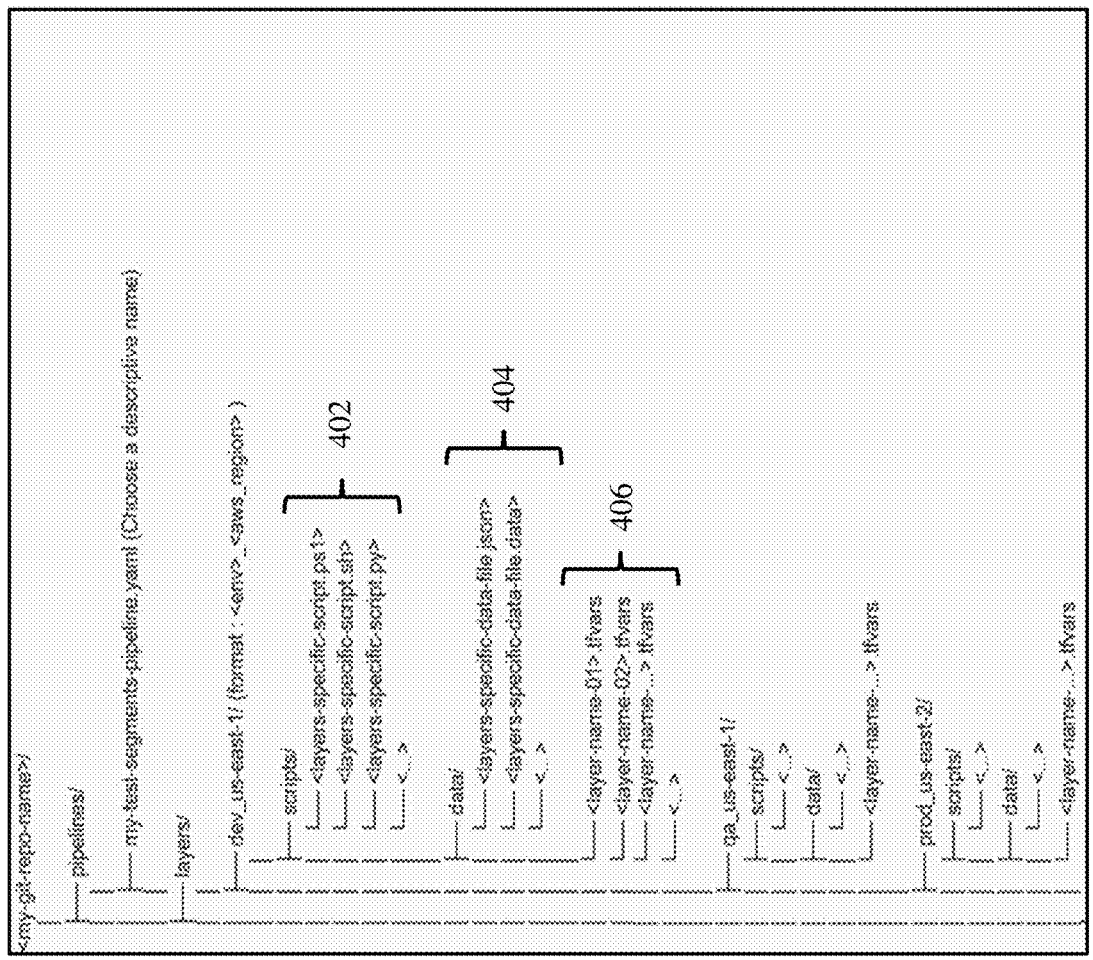
FIG. 4 is a diagram of an exemplary folder structure format for each hierarchical infrastructure layer in the software application deployment.

In some embodiments, as an initial step, the user at remote computing device 102 instructs layer design module 110 to create a folder structure in the software development platform 124 (e.g., GitHub™ repository) that hosts the software application being deployed, according to a specific format. FIG. 4 is a diagram of an exemplary folder structure format 400 that includes defined script files 402 and data files 404 for each hierarchical infrastructure layer 406 (e.g., <layer-name-01>, <layer-name-02>, . . . ) in the software application deployment. The folder structure is also organized based upon the cloud environment and region (e.g., format: <env><aws_region>) in which the corresponding application infrastructure layer is going to be deployed.

The user at remote computing device 102 also instructs pipeline generation module 112 to configure a yaml (YAML Ain't Markup Language) file for the infrastructure layer deployment pipeline. FIG. 5 is a diagram of an exemplary yaml file 500 used to define the deployment pipeline. As shown in FIG. 5, the yaml file 500 includes sections defining the environment 502 (i.e., cloud environment 126) to which the application is to be deployed-including the credentials 502*a* from vault. The yaml file 500 also includes a section 504 defining the layer segments to be executed in the pipeline. Table 1 below includes exemplary descriptions of values for certain parameters in the yaml file of FIG. 5 for an AWS deployment:

TABLE 1

| Parameter | Description | Required? | Example Value |
| --- | --- | --- | --- |
| buildpack:defaultContainer | Default JenkinsCore (JC) Buildpack in which a layer will run | yes | ubn22-aws-utils |
| buildpack:containers | List of all JC Buildpacks that will be used | yes | ubn22-aws-utils |
| environment:<env name>:vault | Definition of vault parameters for the environment | yes | descriptive name for environment (e.g., dev, qa, perf1, prod) |
| vault: PIPELINE_USR | Account username in JC Vault | yes | pr123456/PIPELINE_USR |
| vault: PIPELINE_PSW | Account password in JC Vault | yes | pr123456/PIPELINE_PSW |
| segments:version | Version of Terraform layers to use | yes | release-0.0.34 |
| terraformLayers:stageContainer | Explicit specification of which JC Buildpack these layers will execute in | yes | ubn22-aws-utils |
| parameters:environment | Environment for which deployment is being performed | yes | dev |
| parameters:organization | Organization for which deployment is being performed | yes | org123456 |
| parameters:productLineId | Product Line ID for which deployment is being performed | yes | pl123456 |
| parameters:productId | Product ID for which deployment is being performed | yes | pl123456 |
| parameters:appId | Application ID for which deployment is being performed | yes | ap123456 |
| parameters:cloud_provider | Specify the sub parameters for the cloud_provider for which deployment is being performed | yes | aws |
| parameters:scmcredentialid | Pass the scmcredentialid to access code of layers from source code management (SCM) platform | no | RO-GITHUB-USER |
| parameters:scmurl | Pass the scmurl to access code of layers from SCM platform | no | github.com/<reponame> |
| parameters:branch | Pass the branch to access code of layers from SCM platform | no | main |
| parameters:working_directory | Working directory to be used on the stage container for layer modules | no | terraform_modules |
| parameters:failNonCompliant | If set to 'false', pipeline will continue to run for all layers, even if governance gates fail for any layer. If set to 'true', apply and destroy are skipped for each layer. (Note: if environment is set to prod, this flag will be ignored, and governance | no | false |

TABLE 1-continued

| Parameter | Description | Required? | Example Value |
|---|---|---|---|
| | gates will be enforced, and pipeline will fail and stop if any layer fails governance gate checks) | | |
| parameters:dry_run | If set to 'false', pipeline will execute to produce output from the plan stage without executing the apply/destroy stages. If output looks as expected, then change the value to 'true' and re-run the pipeline to proceed with the apply/destroy stages. | no | false |
| parameters:cloud_provider: aws:accountId | aws:accountId for which deployment is being performed | yes | 123456789012 |
| parameters:cloud_provider: aws:role | aws:role for which deployment is being performed | yes | Org_DevOps |
| parameters:cloud_provider: aws:region | aws:region for which deployment is being performed | yes | us-east-1 |
| layers:<custom-layer-name> | Define all necessary layers in subsections with a custom layer name for each layer | yes | my_layer_01 (with type, version, dependencies) followed by my_layer_02 (with type, version, dependencies), etc. |
| layers:<custom-layer-name>:type | Type of layer being deployed (see Table 2 below) | yes | terraform-aws-kms |
| layers:<custom-layer-name>:version | Version of layer being deployed | yes | 1.0 |
| layers:<custom-layer-name>:dependencies | Layer names of any other layer(s) that this layer is dependent upon. (Note: dependent layers will be deployed before this layer) | no | -dependent-layer-02-name, -dependent-layer-03-name |
| layers:<custom-layer-name>:skip | If 'true', then skip any actions (plan, create, update, destroy, etc.) on this layer | no | false |
| layers:<custom-layer-name>:destroy | If 'true', then destroy this layer (Note: if true, then skip must be false and dependency should not be broken) | no | false |

It should be appreciated that the yaml file should define the configuration for all selected hierarchical infrastructure layers for the software application deployment. For example, if the yaml file includes a defined layer called 'kms_02_layer' of type: 'terraform-aws-kms,' then a Terraform layer configuration variables file should be created called 'layers/dev_us-east-1/var-kms_02_layer.tfvars.'

Table 2 below includes exemplary descriptions of layer types for an AWS deployment:

TABLE 2

| Layer Type | Layer Description |
|---|---|
| terraform-aws-iam | Create/Update/Delete IAM role |
| terraform-aws-lambda | Create/Update/Delete Lambda function |
| terraform-aws-security_group | Create/Update/Delete Security Group |
| terraform-aws-glue | Create/Update/Delete Glue job |
| terraform-aws-kms | Create/Update/Delete Keys |
| terraform-aws-win-ec2 | Create/Update/Delete Windows EC2 instance |
| terraform-aws-dynamodb | Create/Update/Delete DynamoDB tables |
| terraform-aws-efs | Create/Update/Delete EFS storage |
| terraform-aws-linux-ec2 | Create/Update/Delete Linux EC2 instance |
| terraform-aws-nlb | Create/Update/Delete Network Load Balancer |
| terraform-aws-sqs | Create/Update/Delete Simple Queue Service (SQS) Queues |
| terraform-aws-secret_manager | Create/Update/Delete Secrets |
| terraform-aws-s3 | Create/Update/Delete S3 buckets |
| terraform-aws-sns | Create/Update/Delete Simple Notification Service (SQS) Topics |

TABLE 2-continued

| Layer Type | Layer Description |
|---|---|
| terraform-aws-cloudwatch | Create/Update/Delete Cloudwatch log groups, subscription filters, and metric filters |
| terraform-aws-mac-ec2 | Create/Update/Delete Mac EC2 instance |
| terraform-aws-mac-ec2-dedicatedhost | Create/Update/Delete Dedicated Host for Mac EC2 instances |
| terraform-aws-alb | Create/Update/Delete Application Load Balancer |
| terraform-aws-cloudformation | Create/Update/Delete Cloudformation |
| terraform-aws-route53 | Create/Update/Delete Route 53 hosted zone and records |
| terraform-aws-eventbridge | Create/Update/Delete EventBus, Rules, Targets, Archives, Bus Policy, and Event Permissions |

Once the folder structure and yaml file are generated, pipeline generation module 112 generates (step 304) a deployment pipeline for the software application to be deployed to the cloud computing environment. In some embodiments, the pipeline comprises a plurality of pre-coded resource configuration modules (i.e., Terraform™ layer segments) operable to provision the hierarchical infrastructure layers (as defined in the yaml file and SCM folder structure) for the software application in one or more cloud computing environments 126—such as AWS™ or Azure™. FIGS. 6A to 6D are screenshots of exemplary user interfaces for generation of a deployment pipeline. In some embodiments, the user interfaces in FIGS. 6A to 6D are generated by UI module 108 and pipeline generation module 112 for display on remote computing device 102.

Figure 6A:
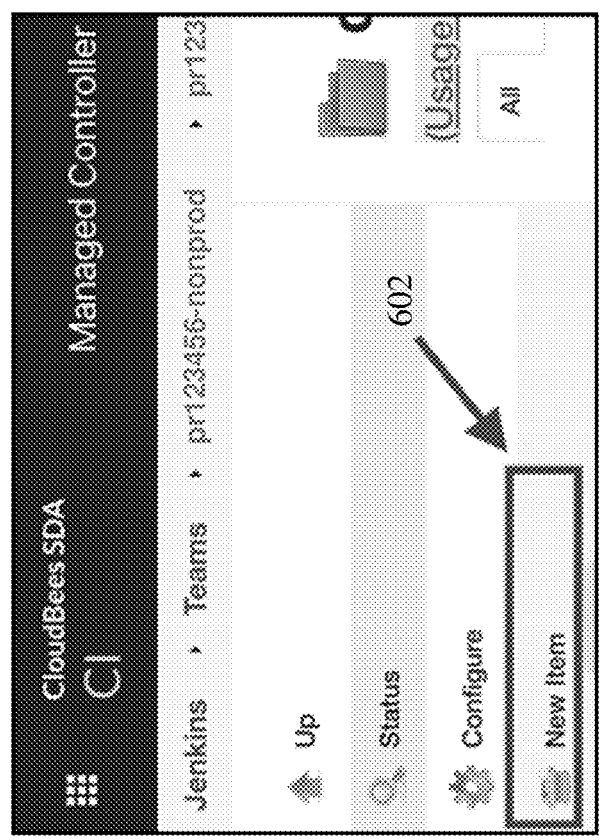
FIGS. 6A to 6D are screenshots of exemplary user interfaces for generation of a deployment pipeline for automating software application infrastructure deployment in a cloud computing environment.
Figure 6B:
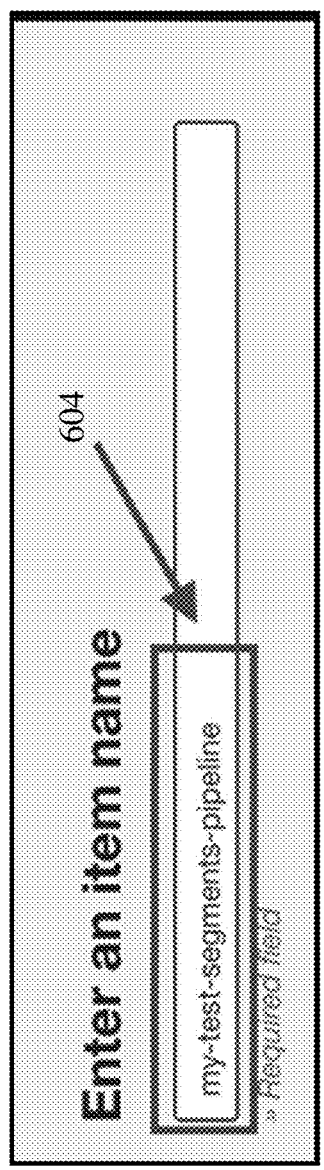
Figure 6C:
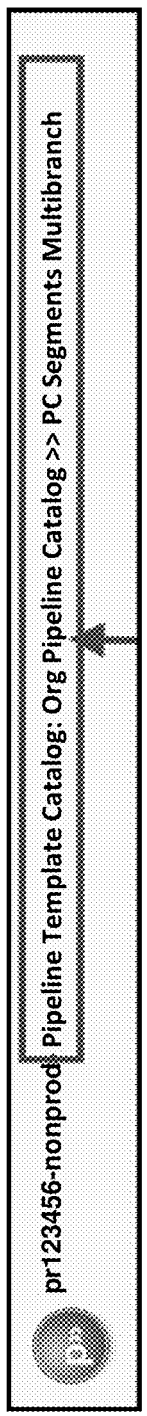

Starting with FIG. 6A, a user at remote computing device 102 can select the "New Item" user interface element 602 to begin the creation of a new deployment pipeline for a specific software application. Once element 602 is activated by the user, UI module 108 can generate the user interface shown in FIG. 6B, which includes an input text box 604 where the user can provide a name for the pipeline (e.g., 'my-test-segments-pipeline'). As mentioned previously, the metadata and other configuration aspects for the newly created pipeline can be stored in database 122 or another suitable data repository. The user then selects a pipeline template/catalog to be used for creating the pipeline using the interface shown in FIG. 6C. For example, the user can select a particular catalog or branch comprising layer segments for constructing the pipeline from a drop-down list 606.

Figure 6D:
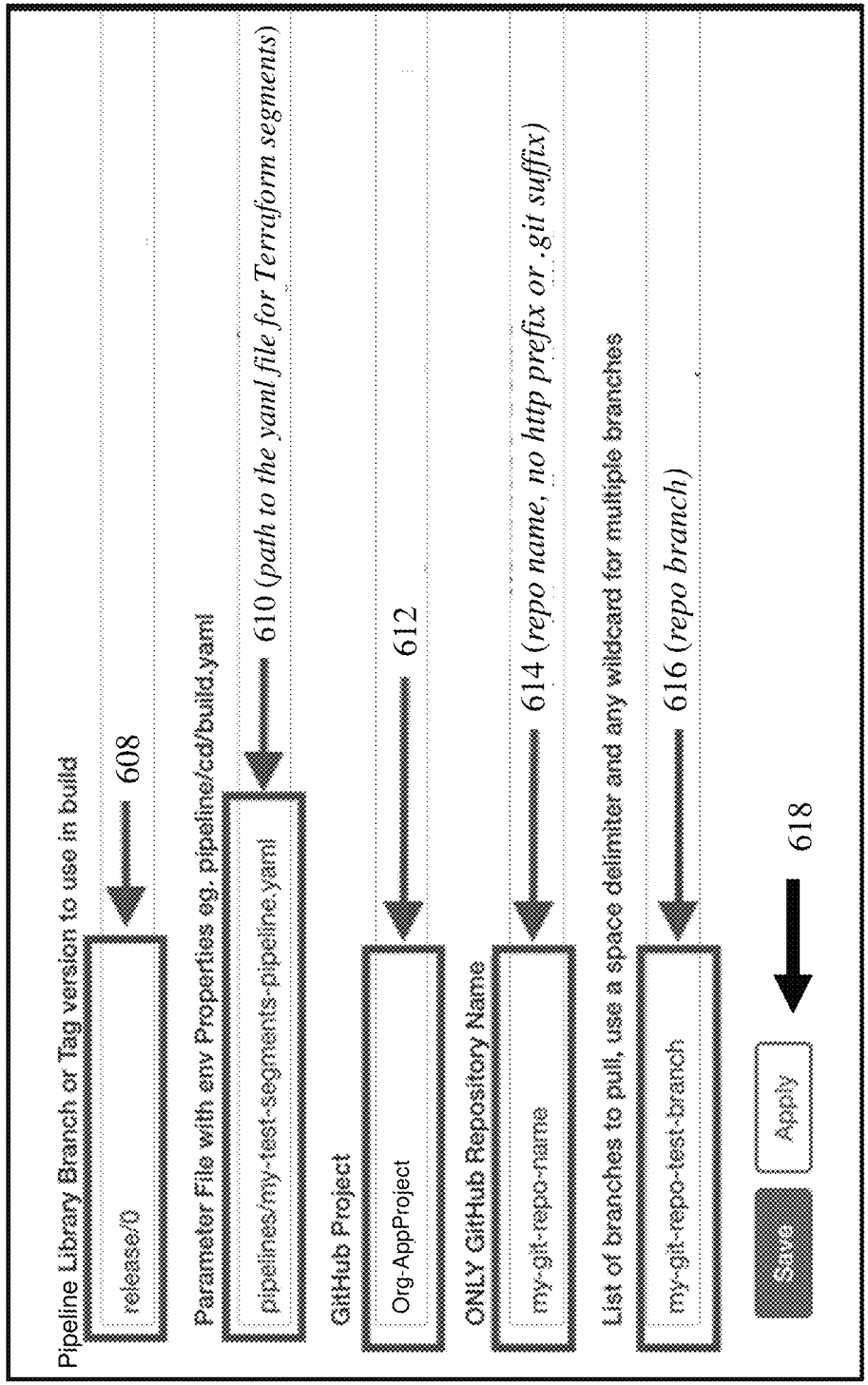

Then, in the interface shown in FIG. 6D, the user can provide values for certain parameters for the pipeline and selected template/catalog. As shown in FIG. 6D, the user can denote the pipeline library branch or tag version to use in the pipeline (field 608), the path for the yaml file that comprises the Terraform code segments to be used (field 610), the GitHub project name (field 612), the GitHub repository name (field 614), and the list of branches to pull from the GitHub repository (field 616). Once the user has entered the corresponding values, they can interact with the Save button 618 to save the new pipeline.

After the pipeline is created, the user at remote computing device 102 can initiate execution of the pipeline to deploy the corresponding software application to the cloud computing environment 124. Upon receiving an indication from remote computing device 102 to begin pipeline execution, pipeline generation module 112 of server computing device 106 connects to software development interface 114 and software development platform 124 to retrieve the Terraform code modules and trigger execution (step 306) of the pipeline for the cloud computing environment 126.

As part of the pipeline execution process, layer validation module 116 validates (step 306a) the hierarchical infrastructure layers for the software application using one or more compliance policies. In some embodiments, module 116 checks the release readiness of the application infrastructure by performing a validation of the user (such as authentication credentials check) as well as validating the application infrastructure against one or more compliance policies using, e.g., a governance gate API (as shown in function block 204 of FIG. 2). For example, module 116 can be configured to issue a validation request to the governance gate API and pass as input the Terraform pipeline configuration/plan—including identification and structure of the layer segments defined in the yaml file—that is getting deployed to cloud environment 126. The governance gate API can confirm that the pipeline configuration/plan is compliant with one or more technical or organizational policies-such as enterprise cloud compliance (ECC) policies defined by the organization that is deploying the application to the cloud. For example, one or more layers of the application infrastructure defined in a particular deployment pipeline may not have the correct dependencies-if such an infrastructure is deployed, it would result in an inoperable application. In another example, the application infrastructure may be misconfigured to deploy to an invalid or incorrect environment. In yet another example, the application infrastructure defined in the pipeline may not be in compliance with certain regulatory requirements (e.g., security, redundancy, resource governance) that are imposed upon the organization. If the pipeline configuration/plan fails validation (e.g., one or more aspects of the application and/or configuration do not satisfy the requirements of one or more compliance policies), the governance gate API can issue a response to layer validation module 116 that indicates failure of the compliance check. Layer validation module 116 can transmit a notification to one or more remote computing devices 102 indicating that the failure has occurred. Layer validation module 116 can also instruct UI module 108 to display the failure notification to the user of remote computing device 108. Under these circumstances, the application infrastructure is not deployed to the cloud environment 126 and execution of the pipeline is terminated.

When the application infrastructure is successfully validated by module 116, application deployment module 118 executes (step 306b) each of the pre-coded resource configuration modules (i.e., Terraform layer segments and related code modules) in the pipeline to deploy the software application in the cloud computing environment 126. In some embodiments, application deployment module 118 configures, for each pre-coded resource configuration module, one or more computing resources in the cloud computing environment according to the defined hierarchical infrastructure layers for the software application. Module 118 parses the yaml file to extract the layer hierarchy for the application and deploys each of the layers in cloud environment 126 according to hierarchy and related parameters for each layer. In one example, module 118 can read the yaml file to determine that a kms layer and an sqs layer should be created and configured in the cloud environment for a particular application. Module 118 retrieves the corresponding script files (.ps1, .sh, .py), data files (json, .data), and variable files (tfvars) for each of the layers and executes the script files to issue commands to one or more computing devices in cloud computing environment 126 to create the application infrastructure layers. In some embodiments, once the application infrastructure layers are created in cloud environment 126, application deployment module 118 also retrieves application code, artifacts, libraries, and related data from, e.g., software development platform 124 (such as the GitHub repository for the project) and deploys the application code in the newly created infrastructure.

Application deployment module 118 then determines (step 306c) that the deployment pipeline has completed execution by verifying one or more aspects of the deployed software application. In some embodiments, as module 118 executes each script defined in the yaml file, module 118 generates a log file that comprises indicia relating to each of the commands issued by module 118 to cloud environment 126 (and the corresponding responses from environment 126). For example, if one of the script commands fails to properly complete in cloud environment 126, the log file can contain an error message or other data to confirm the failure. When verifying deployment of the software application, module 118 can analyze the log files to identify whether any errors occurred during execution of the pipeline and based upon this analysis, module 118 can issue a success notification or a failure notification relating to the pipeline execution. In another example, application deployment module 118 can execute one or more test scripts against the deployed application in cloud environment 126 to verify whether deployment was successful or not. Module 118 may request access to certain functionality of the software application using the test script and receive a response to the access request from the cloud environment 126. Module 118 can then evaluate the response to determine whether, e.g., the application is functioning properly.

After completion of the pipeline execution and validation of the application deployment, application deployment module 118 transmits (step 306d) a notification message to one or more remote computing devices (e.g., device 102). As mentioned above, the notification message can indicate whether application infrastructure deployment completed successfully or whether one or more issues occurred during deployment. In some embodiments, the notification message is transmitted by module 118 to UI module 108 for presentation to the user on remote computing device 102.

When the software application is deployed successfully to the cloud computing environment 126, application publishing module 120 makes the application available (step 308) to receive application access requests from one or more client computing devices (e.g., device 102 and/or devices 103). In some embodiments, application publishing module 120 publishes the deployed application build in environment 126 to enable external computing resources to access the application. To publish the deployed application, module 120 can instruct one or more resources in cloud computing environment 126 to expose the application to traffic from external computing resources via, e.g., a URL address for the application. In some embodiments, module 120 also publishes the application in, e.g., a digital exchange so that other resources-including external computing resources—are aware of the application's availability and how to access it.

It can be appreciated that the techniques described herein can be used to deploy application infrastructure to either a non-production (e.g., test) cloud environment or a production cloud environment where end users can interact with the deployed software application to request data, complete tasks, and other functions. The deployment process can differ slightly depending upon which environment is the target.

Figure 7:
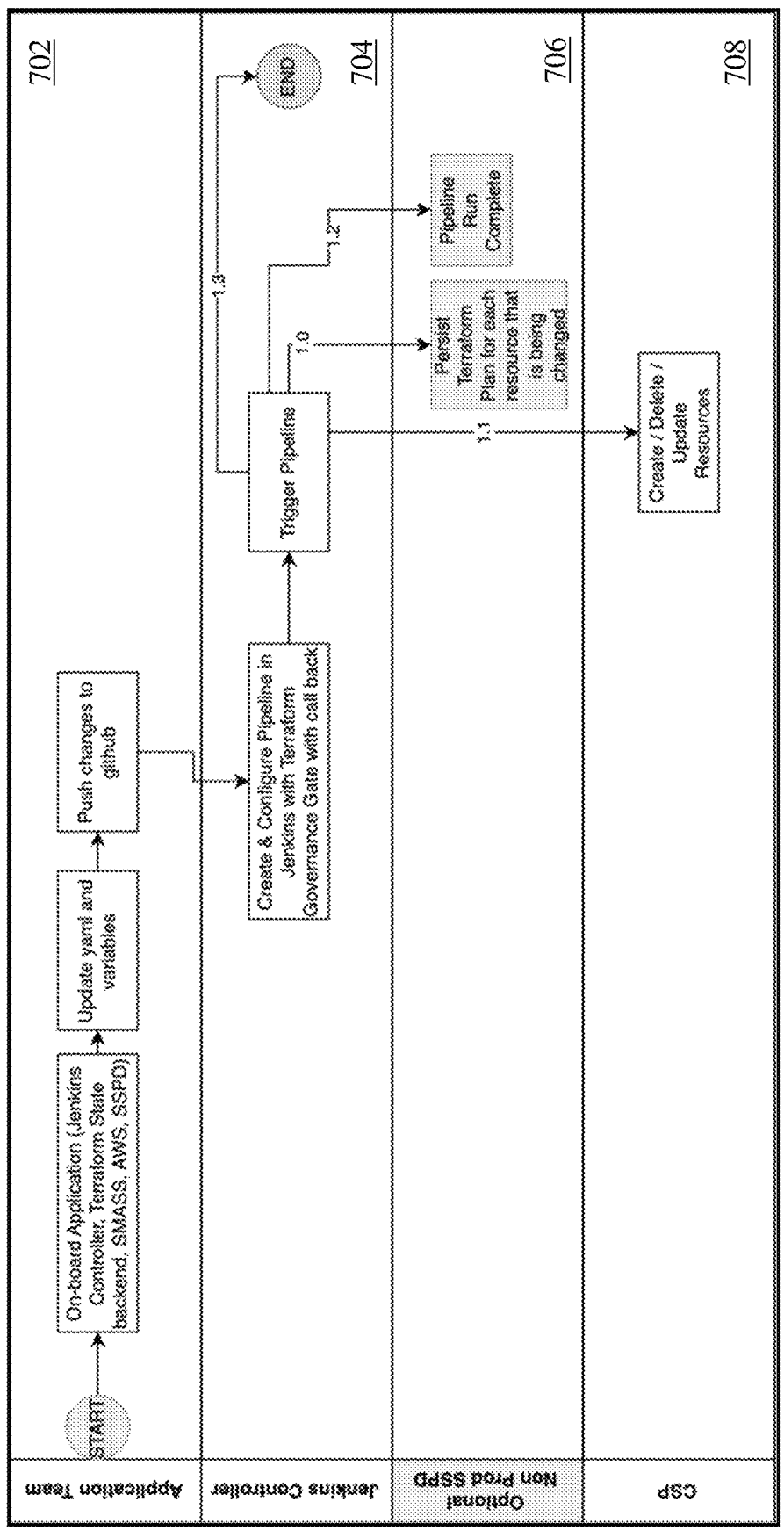
FIG. 7 is a workflow diagram of an exemplary application infrastructure deployment process for a non-production environment.

FIG. 7 is a workflow diagram of an exemplary application infrastructure deployment process 700 for a non-production environment, using system 100 of FIG. 1. As shown in FIG. 7, the non-production deployment process 700 includes an initial process 702 performed by, e.g., an application development team-which includes on-boarding the software application into the deployment framework (described above in function blocks of FIG. 2), updating the yaml file and variables file, and pushing the infrastructure deployment changes to GitHub (block 202 of FIG. 2). Next, the Jenkins controller 204a performs process 704 to create and configure the corresponding infrastructure deployment pipeline in Jenkins with a Terraform governance gate (with call back). Controller 204a then triggers the deployment pipeline, which utilizes a non-production self-service production deployment (SSPD) tool (706) to persist the Terraform plan for each resource in cloud computing environment 126 that is being added or changed. The corresponding resources are then created, deleted, and/or updated (708) in cloud service provider (CSP) cloud computing environment 126 according to the Terraform plan. Once the SSPD tool completes the pipeline run, the deployment ends.

Figure 8:
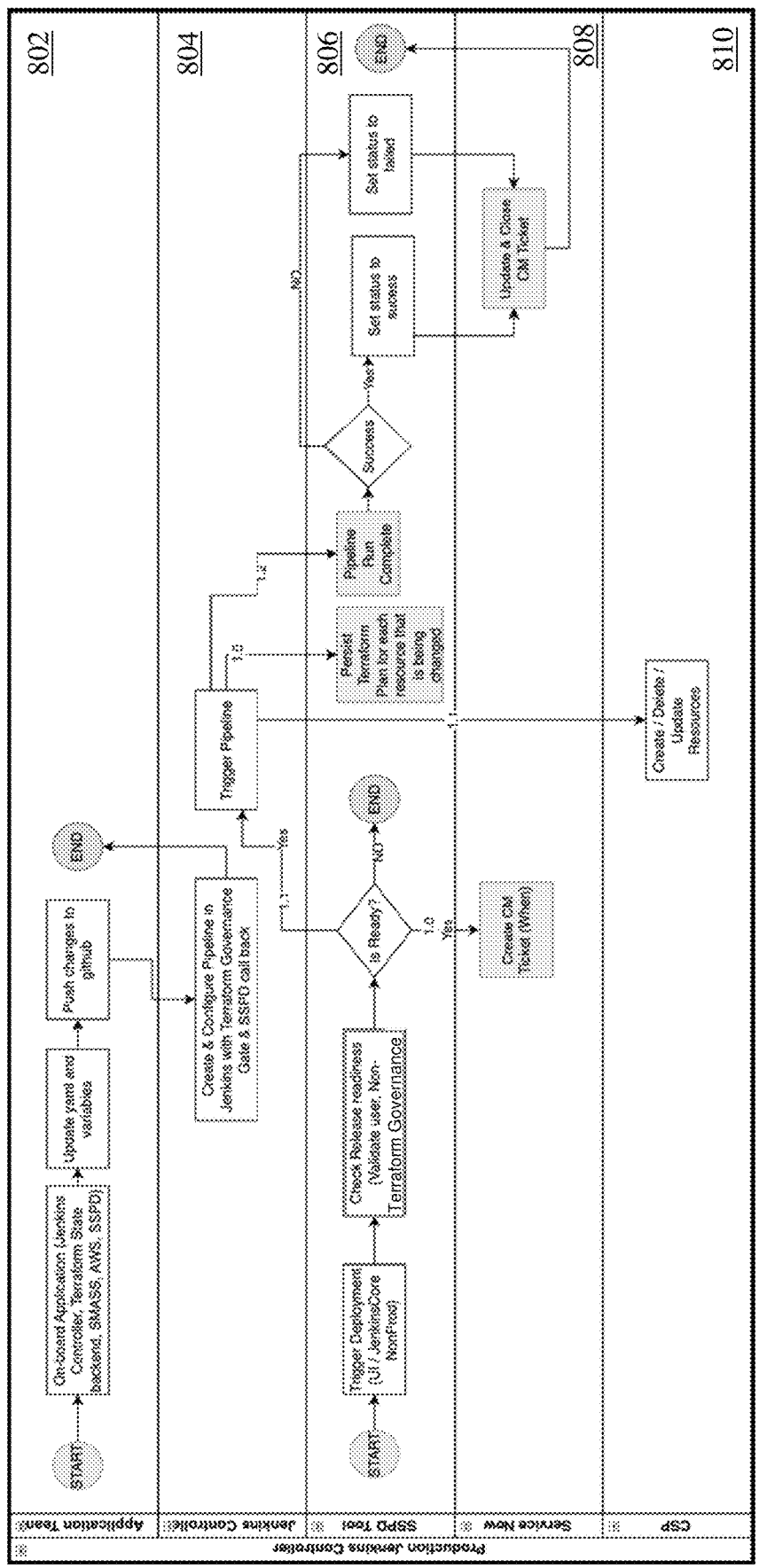
FIG. 8 is a workflow diagram of an exemplary application infrastructure deployment process for a production environment.

Similarly, FIG. 8 is a workflow diagram of an exemplary application infrastructure deployment process 800 for a production environment, using system 100 of FIG. 1. As shown in FIG. 7, the production deployment process 800 includes an initial process 802 performed by, e.g., an application development team-which includes on-boarding the software application into the deployment framework (described above in function blocks of FIG. 2), updating the yaml file and variables file, and pushing the infrastructure deployment changes to GitHub (block 202 of FIG. 2). Next, the Jenkins controller 204a performs process 804 to create and configure the corresponding infrastructure deployment pipeline in Jenkins with a Terraform governance gate (with SSPD call back). Once the pipeline has been created, controller 204a ends the initial deployment phase.

A user at remote computing device 102 subsequently triggers deployment (806) of the application with the created pipeline using SSPD tool. Server computing device 106 checks release readiness of the application infrastructure and determines whether the infrastructure is ready for deployment. If yes, server computing device 106 can create a change management (CM) ticket in, e.g., an issue tracking/change management software platform (e.g., ServiceNow™) (808) that indicates when the infrastructure will be deployed. Server computing device 106 also triggers execution of the pipeline using controller 204a, which instructs SSPD tool to persist the Terraform plan for each resource in cloud computing environment 126 that is being added or changed. The corresponding resources are then created, deleted, and/or updated (810) in cloud service provider (CSP) cloud computing environment 126 according to the Terraform plan. Server computing device 106 confirms whether deployment of the infrastructure was successful. In either case, SSPD tool updates and closes the change management ticket with the corresponding outcome and ends the deployment phase.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account-allowing access to the computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM (dynamic random-access memory), SRAM (static random-access memory), EPROM (erasable programmable read-only memory), EEPROM (electrically erasable programmable read-only memory), and flash memory devices (e.g., NAND (NOT-AND) flash memory, solid state drives (SSD)); magnetic disks, e.g., internal hard disks or removable disks; magneto-optical disks; and optical disks, e.g., CD (compact disc), DVD (digital video disc), HD-DVD (high-definition digital video disc), and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), a private IP network, an IP private branch exchange (IPBX), a wireless network (e.g., radio access network (RAN), Bluetooth™ near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automating infrastructure deployment in a cloud computing environment, the system comprising a server computing device having a memory for storing computer-executable instructions and a processor that executes the computer-executable instructions to:

define a plurality of hierarchical infrastructure layers for a software application, each layer comprising one or more computing resources used for execution of the software application in a cloud computing environment associated with a specific service provider, including (i) creating a folder structure in a code repository coupled to the server computing device that includes defined script files and data files for each hierarchical infrastructure layer of the software application, the folder structure organized based upon a region of the service provider's cloud computing environment in which the hierarchical infrastructure layers will be deployed, and (ii) creating a configuration file that defines a configuration for all of the hierarchical infrastructure layers of the software application to be deployed in the service provider's cloud computing environment;

generate a deployment pipeline for the software application in the service provider's cloud computing environment, the pipeline comprising a plurality of pre-coded resource configuration modules operable to provision the hierarchical infrastructure layers for the software application in the service provider's cloud computing environment; and trigger execution of the deployment pipeline to deploy the software application in the service provider's cloud computing environment, comprising:
  validating the hierarchical infrastructure layers for the software application using one or more compliance policies,
  executing each of the pre-coded resource configuration modules in the pipeline to deploy the software application in the service provider's cloud computing environment, including, for each pre-coded resource configuration module, configuring one or more computing resources in the service provider's cloud computing environment according to the defined hierarchical infrastructure layers for the software application and executing the defined script files for each hierarchical infrastructure layer of the software application,
  determining that the deployment pipeline has completed execution by programmatically verifying one or more aspects of the deployed software application, and
  transmitting a notification message to one or more remote computing devices upon completion of the pipeline execution, and
make the deployed software application available to receive application access requests from one or more client computing devices.

2. The system of claim 1, wherein the pre-coded resource configuration modules are stored in the code repository.

3. The system of claim 1, wherein the pre-coded resource configuration modules are arranged in a defined execution sequence within the deployment pipeline based upon the configuration file.

4. The system of claim 1, wherein executing each of the pre-coded resource configuration modules in the pipeline to deploy the software application in the service provider's cloud computing environment includes, for one or more of the pre-coded resource configuration modules, authenticating to the service provider's cloud computing environment using authentication credentials provided in the configuration file prior to executing the pre-coded resource configuration modules.

5. The system of claim 1, wherein executing each of the pre-coded resource configuration modules in the pipeline to deploy the software application in the service provider's cloud computing environment includes, for one or more of the pre-coded resource configuration modules, invoking an application programming interface to connect to an external resource provider and retrieving one or more resource configuration files from the external resource provider to configure the corresponding computing resources in the service provider's cloud computing environment.

6. The system of claim 1, wherein executing each of the pre-coded resource configuration modules in the pipeline to deploy the software application in the service provider's cloud computing environment includes, for one or more of the pre-coded resource configuration modules, running one or more performance tests against the corresponding computing resources in the service provider's cloud computing environment.

7. The system of claim 1, wherein executing each of the pre-coded resource configuration modules in the pipeline to deploy the software application in the service provider's cloud computing environment includes, for one or more of the pre-coded resource configuration modules, installing one or more components of the software application within the corresponding computing resources in the service provider's cloud computing environment.

8. The system of claim 1, wherein each of the hierarchical infrastructure layers comprise one or more services that support operation of the software application in the service provider's cloud computing environment.

9. The system of claim 8, wherein lower infrastructure layers in the hierarchy expose services for use by higher infrastructure layers in the service provider's cloud computing environment.

10. A computerized method of automating infrastructure deployment in a cloud computing environment, the method comprising:
    defining, by a server computing device, a plurality of hierarchical infrastructure layers for a software application, each layer comprising one or more computing resources used for execution of the software application in a cloud computing environment associated with a specific service provider, including (i) creating a folder structure in a code repository coupled to the server computing device that includes defined script files and data files for each hierarchical infrastructure layer of the software application, the folder structure organized based upon a region of the service provider's cloud computing environment in which the hierarchical infrastructure layers will be deployed, and (ii) creating a configuration file that defines a configuration for all of the hierarchical infrastructure layers of the software application to be deployed in the service provider's cloud computing environment;
    generating, by the server computing device, a deployment pipeline for the software application in the service provider's cloud computing environment, the pipeline comprising a plurality of pre-coded resource configuration modules operable to provision the hierarchical infrastructure layers for the software application in the service provider's cloud computing environment; and
    triggering, by the server computing device, execution of the deployment pipeline to deploy the software application in the service provider's cloud computing environment, comprising:
        validating the hierarchical infrastructure layers for the software application using one or more compliance policies,
        executing each of the pre-coded resource configuration modules in the pipeline to deploy the software application in the service provider's cloud computing environment, including, for each pre-coded resource configuration module, configuring one or more computing resources in the service provider's cloud computing environment according to the defined hierarchical infrastructure layers for the software application and executing the defined script files for each hierarchical infrastructure layer of the software application,
        determining that the deployment pipeline has completed execution by programmatically verifying one or more aspects of the deployed software application, and
        transmitting a notification message to one or more remote computing devices upon completion of the pipeline execution; and
    making the deployed software application available to receive application access requests from one or more client computing devices.

11. The method of claim 10, further comprising storing the pre-coded resource configuration modules in the code repository.

12. The method of claim 10, further comprising arranging the pre-coded resource configuration modules in a defined execution sequence within the deployment pipeline based upon the configuration file.

13. The method of claim 10, wherein executing each of the pre-coded resource configuration modules in the pipeline to deploy the software application in the service provider's cloud computing environment includes, for one or more of the pre-coded resource configuration modules, authenticating to the service provider's cloud computing environment using authentication credentials provided in the configuration file prior to executing the pre-coded resource configuration modules.

14. The method of claim 10, wherein executing each of the pre-coded resource configuration modules in the pipeline to deploy the service provider's software application in the cloud computing environment includes, for one or more of the pre-coded resource configuration modules, invoking an application programming interface to connect to an external resource provider and retrieving one or more resource configuration files from the external resource provider to configure the corresponding computing resources in the service provider's cloud computing environment.

15. The method of claim 10, wherein executing each of the pre-coded resource configuration modules in the pipeline to deploy the software application in the service provider's cloud computing environment includes, for one or more of the pre-coded resource configuration modules, running one or more performance tests against the corresponding computing resources in the service provider's cloud computing environment.

16. The method of claim 10, wherein executing each of the pre-coded resource configuration modules in the pipeline to deploy the software application in the service provider's cloud computing environment includes, for one or more of the pre-coded resource configuration modules, installing one or more components of the software application within the corresponding computing resources in the service provider's cloud computing environment.

17. The method of claim 10, wherein each of the hierarchical infrastructure layers comprise one or more services that support operation of the software application in the service provider's cloud computing environment.

18. The method of claim 17, wherein lower infrastructure layers in the hierarchy expose services for use by higher infrastructure layers in the service provider's cloud computing environment.

19. The system of claim 1, wherein executing each of the pre-coded resource configuration modules in the pipeline to deploy the software application in the service provider's cloud computing environment includes generating log files associated with the execution of each defined script file, and programmatically verifying one or more aspects of the deployed software application includes analyzing the log files to identify errors occurring during execution of the pre-coded resource configuration modules in the pipeline.

20. The method of claim 10, wherein executing each of the pre-coded resource configuration modules in the pipeline to deploy the software application in the service provider's cloud computing environment includes generating log files associated with the execution of each defined script file, and programmatically verifying one or more aspects of the deployed software application includes analyzing the log files to identify errors occurring during execution of the pre-coded resource configuration modules in the pipeline.

* * * * *